G. T. HUME.
DRIER.
APPLICATION FILED OCT. 23, 1913. RENEWED AUG. 22, 1914.

1,121,186.

Patented Dec. 15, 1914.

Witnesses
H. O. Hickman Jr.
C. C. Hines

Inventor
George T. Hume
By
Attorney

UNITED STATES PATENT OFFICE.

GEORGE T. HUME, OF CLINTON, ILLINOIS.

DRIER.

1,121,186.   Specification of Letters Patent.   Patented Dec. 15, 1914.

Application filed October 23, 1913, Serial No. 796,862. Renewed August 22, 1914. Serial No. 853,130.

*To all whom it may concern:*

Be it known that I, GEORGE T. HUME, a citizen of the United States, residing at Clinton, in the county of Dewitt and State of Illinois, have invented certain new and useful Improvements in Driers, of which the following is a specification.

This invention relates to devices particularly designed for household use for drying fruits, seeds and vegetables, the primary object of the invention being to provide a drier which is of simple construction and susceptible of manufacture at a comparatively low cost, and by means of which fruits, seeds or vegetables may be artificially or naturally dried.

A further object of the invention is to provide a drier of the indicated character which comprises a substantially oblong rectangular box or tray having certain specified features, as hereinafter fully set forth, whereby the advantages sought are attained, and which is light in weight and adapted to be readily and conveniently handled and is at the same time insect-proof.

The invention consists of the features of construction, combination and arrangement of parts, hereinafter fully described and claimed, reference being had to the accompanying drawing, in which:—

Figure 1:
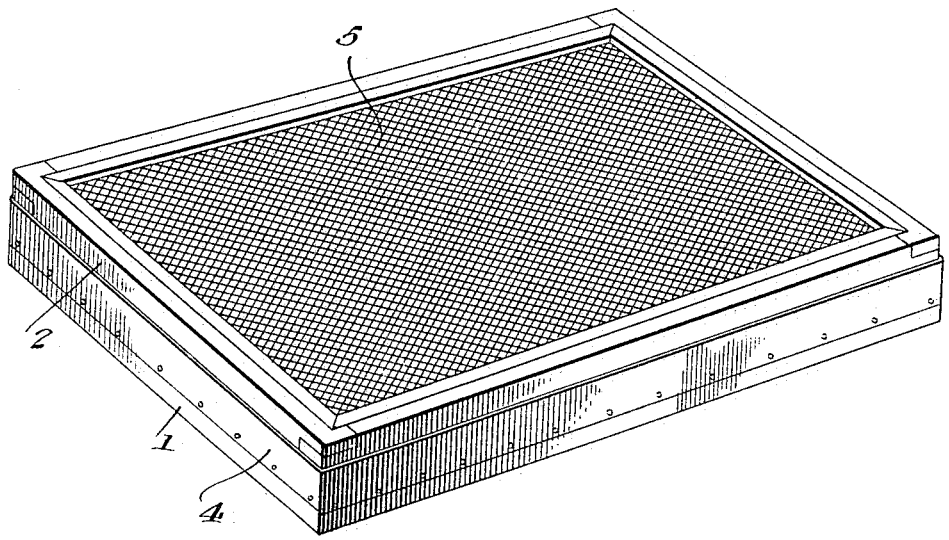
Figure 2:
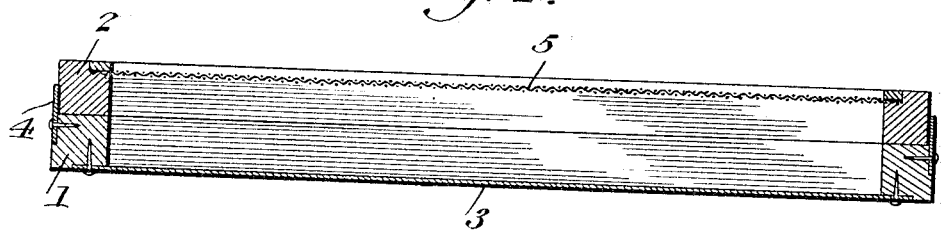

Figure 1 is a perspective view of a fruit drier embodying my invention; and Fig. 2 is a vertical longitudinal section thereof.

The device comprises an oblong rectangular box or tray consisting of bottom and top sections 1 and 2, each of said sections consisting mainly of an open frame of wood or other suitable material, the frame sections being substantially counter-parts of each other.

The lower frame section 1 is provided with a bottom 3, preferably of sheet metal, and forms, in conjunction with the section 2, when the latter is superposed thereon, a box, tray or receptacle to contain the fruit, seed or vegetable to be dried.

As shown, the section 1 is provided with a marginal retaining strip 4 of sheet metal or other suitable material projecting upwardly beyond the upper face thereof and which is adapted to overlap and engage the lower portion of the section 2, when the latter is applied, to hold the sections from relative displacement, while permitting the section 2 to be applied and removed in a ready and convenient manner at any time. The opening in the section 2 is closed at its top by a screen 5 of wire or other suitable material, which is designed to allow the ready circulation of heat and escape of moisture from the fruit or other substance being dried, while at the same time protecting the contents of the drier from insects, etc.

In practice, the device may be employed for either indoor or outdoor use for the artificial or natural drying of fruits, seeds and vegetables, and provides a convenient household article for the purpose which may be easily handled. The sheet metal bottom of the lower section adapts the device to be arranged upon a stove or above a burner whenever it is desired to apply heat directly thereto for artificial drying.

Having thus described my invention, I claim:

1. A drier comprising upper and lower sections, each comprising an open frame, a sheet metal bottom closing the opening in the lower section, a screen top covering the opening in the top section, and means for retaining the said sections in assembled relation.

2. A drier comprising upper and lower sections, each consisting of an oblong, rectangular open frame, a metal plate closing the bottom of the lower section, a metal screen closing the top of the upper section, and a strip extending around the lower section and projecting upwardly therefrom to inclose and retain the upper section in position thereon.

In testimony whereof I affix my signature in presence of two witnesses.

GEORGE T. HUME.

Witnesses:
 GEO. B. MARVEL,
 NELLIE P. DANKS.

Copies of this patent may be obtained for five cents each, by addressing the "Commissioner of Patents, Washington, D. C."